(12) United States Patent
Fujii et al.

(10) Patent No.: US 9,760,808 B2
(45) Date of Patent: Sep. 12, 2017

(54) IMAGE PROCESSING SYSTEM, SERVER DEVICE, IMAGE PICKUP DEVICE AND IMAGE EVALUATION METHOD

(71) Applicant: PANASONIC CORPORATION, Osaka (JP)

(72) Inventors: Hirofumi Fujii, Kanagawa (JP); Sumio Yokomitsu, Tokyo (JP); Takeshi Watanabe, Kanagawa (JP); Masataka Sugiura, Tokyo (JP); Michio Miwa, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 14/394,581

(22) PCT Filed: Apr. 18, 2013

(86) PCT No.: PCT/JP2013/002615
§ 371 (c)(1),
(2) Date: Oct. 15, 2014

(87) PCT Pub. No.: WO2013/157265
PCT Pub. Date: Oct. 24, 2013

(65) Prior Publication Data
US 2015/0071548 A1    Mar. 12, 2015

(30) Foreign Application Priority Data

Apr. 18, 2012 (JP) ................................ 2012-094538

(51) Int. Cl.
*G06K 9/46* (2006.01)
*G06K 9/68* (2006.01)
(Continued)

(52) U.S. Cl.
CPC ....... *G06K 9/6857* (2013.01); *G06K 9/00979* (2013.01); *G06K 9/036* (2013.01);
(Continued)

(58) Field of Classification Search
None
See application file for complete search history.

(56) References Cited

U.S. PATENT DOCUMENTS

2008/0317349 A1    12/2008    Ishikawa

FOREIGN PATENT DOCUMENTS

EP    1227429 A2    7/2002
JP    2002-024828    1/2002
(Continued)

OTHER PUBLICATIONS

Extended European Search Report in EP 13778207.4, dated Oct. 2, 2015.
(Continued)

*Primary Examiner* — Fred Hu
(74) *Attorney, Agent, or Firm* — Greenblum & Bernstein, P.L.C.

(57) ABSTRACT

An image pickup device transmits to a server a transmission sample including a detection image detected by a first detection section from a transmitting/receiving section under the control of a transmission sample control section. The server performs detection processing that requires more resources than those of the first detection section on the detection image transmitted by a second detection section from the image pickup device, and determines whether or not the detection image in question is spurious, based on a second detection score which is thereby obtained. A transmission frequency deciding section generates transmission frequency control information such as to raise the transmission frequency by an image pickup device that has a high (Continued)

frequency of spurious detection; a transmitting/receiving section transmits the transmission frequency control information to the image pickup device.

3 Claims, 8 Drawing Sheets

(51) Int. Cl.
    *H04N 7/18*         (2006.01)
    *G06K 9/00*         (2006.01)
    *G06K 9/03*         (2006.01)

(52) U.S. Cl.
    CPC ............... *H04N 7/18* (2013.01); *H04N 7/181* (2013.01); *G06K 2009/6864* (2013.01)

(56) References Cited

FOREIGN PATENT DOCUMENTS

| JP | 2002024828 A * | 1/2002 | |
|---|---|---|---|
| JP | 2002-204444 | 7/2002 | |
| JP | 2002204444 A * | 7/2002 | |
| JP | EP 1227429 A2 * | 7/2002 | ......... G06K 9/00087 |
| JP | 2009-003898 | 1/2009 | |

OTHER PUBLICATIONS

Search report from PCT/JP2013/0002615, with English language translation, mail date is Jul. 9, 2013.

\* cited by examiner

IMAGE PROCESSING SYSTEM, SERVER DEVICE, IMAGE PICKUP DEVICE AND IMAGE EVALUATION METHOD

TECHNICAL FIELD

The present invention relates to an image processing system, a server apparatus, an imaging apparatus, and an image determining method for extracting desired data from a photographed image.

BACKGROUND ART

In recent years, there has been an increasing need for image processing techniques for extracting desired data from an image photographed by an imaging apparatus such as a camera. Examples of expected techniques include one that detects a face of a person captured by a surveillance camera, extracts parameters indicating features such as eyes, a mouth, or hair from the detected face, compares the extracted parameters with previously prepared corresponding parameters, and acquires information such as an age or a sex of the person captured by the surveillance camera.

As an example of a technique to which such an image processing technique is applied, a remote meter-reading system is disclosed in Patent Literature (hereinafter, abbreviated as "PTL") 1. FIG. 1 is a block diagram illustrating a configuration of a remote meter-reading system disclosed in PTL 1. Referring to FIG. 1, the remote meter-reading system includes remote meter-reading apparatus 10 and meter-reading sensor 20.

Remote meter-reading apparatus 10 includes: imaging section 11 that photographs indicator value display 2 of meter 1; pattern recognizing section 12 that generates indicator value pattern C based on original image A photographed by imaging section 11 and recognizes indicator value D; determining section 13 that determines whether or not the recognition result is valid; and communication section 15 that transmits predetermined meter-reading data to meter-reading center 20 via communication path 3 based on the determination result.

When determining section 13 determines that the recognition result is valid, remote meter-reading apparatus 10 transmits indicator value D as meter-reading data. Meanwhile, when determining section 13 determines that the recognition result of at least some digits of the indicator value is not valid, remote meter-reading apparatus 10 transmits determination result F, original image A, and indicator value pattern C, or intermediate image B for the data as indicator data.

Meter-reading center 20 includes: communication section 21 that receives predetermined meter-reading data such as an indicator value or image data via predetermined communication path 3; second pattern recognizing section 22 that recognizes indicator value E of digits determined as being invalid in the recognition result at least in remote meter-reading apparatus 10 from original image A, intermediate image B, or indicator value pattern C received from remote meter-reading apparatus 10; second determining section 23 that determines whether or not the recognition result obtained by second pattern recognizing section 22 is valid; and meter-reading result recording section 24 that records indicator value D received by communication section 21 and indicator value E recognized by second pattern recognizing section 22.

According to above-described remote meter-reading system, even when a remote meter-reading apparatus cannot recognize or erroneously recognizes an indicator value, it is possible to correctly recognize an indicator value from a remote site such as the meter-reading sensor.

CITATION LIST

Patent Literature

PTL 1
Japanese Patent Application Laid-Open No. 2002-24828

SUMMARY OF INVENTION

Technical Problem

In the remote meter-reading system disclosed in PTL 1, however, since the process of recognizing and determining image data in the imaging apparatus (corresponding to the remote meter-reading apparatus) that photographs an image is simple, there is no increase in the processing load of the camera side, but detecting a face of a person captured by the surveillance camera requires an advanced process to determine whether or not erroneous detection has occurred. For this reason, there arises a problem in that the processing load of the imaging apparatus increases.

It is an object of the present invention to provide an image processing system, a server apparatus, an imaging apparatus, and an image determining method that reduce the processing load of an imaging apparatus and that efficiently determine erroneous detection in the imaging apparatus.

Solution to Problem

An image processing system according to an aspect of the present invention includes: an imaging apparatus; and a server apparatus, in which the imaging apparatus includes: an imaging section that receives an image from an imaging element; a first detecting section that detects a desired image region from the received image; a transmission sample control section that selects an image region for a band in ascending order of first detection scores among the detected image regions; and a transmitting section that transmits the selected image region, and the server apparatus includes: a second detecting section that performs a detection process requiring more resources than the first detecting section on the image region transmitted from the imaging apparatus, and that determines the image region whose detected second detection score is less than a predetermined threshold to be an erroneous detection.

A server apparatus according to an aspect of the present invention includes: a second detecting section that performs, on an image region transmitted from an imaging apparatus, a detection process requiring more resources than resources used for detection of the image region in the imaging apparatus, and that determines the image region whose detected second detection score is less than a predetermined threshold to be an erroneous detection; a transmission frequency deciding section that decides transmission frequency for the imaging apparatus for which frequency of an erroneous detection determination is equal to or greater than predetermined frequency, and that generates transmission frequency control information representing the decided transmission frequency; and a transmitting section that transmits the generated transmission frequency control information to the imaging apparatus.

A server apparatus according to an aspect of the present invention includes: a second detecting section that performs, on an image region transmitted from an imaging apparatus, a detection process requiring more resources than resources used for detection of the image region in the imaging apparatus, and that determines the image region whose detected second detection score is less than a predetermined threshold to be an erroneous detection; an erroneous detection region deciding section that measures a number of detection images determined to be an erroneous detection for each of a plurality of regions obtained by dividing an entire input image in the imaging apparatus, that decides a region in which a predetermined number of the detection images are measured, and that generates erroneous detection region information representing the decided region; and a transmitting section that transmits the generated erroneous detection region information to the imaging apparatus.

An imaging apparatus according to an aspect of the present invention includes: an imaging section that receives an image from an imaging element; a first detecting section that detects a desired image region from the received image; a transmission sample control section that selects an image region for a band in ascending order of first detection scores among the detected image regions; and a transmitting section that transmits the selected image region.

An image determining method according to an aspect of the present invention includes: a second detecting process of performing, on an image region transmitted from an imaging apparatus, a detection process requiring more resources than resources used for detection of the image region in the imaging apparatus, and determining the image region whose detected second detection score is less than a predetermined threshold to be an erroneous detection; and a transmission frequency deciding process of deciding transmission frequency for the imaging apparatus for which frequency of an erroneous detection determination is equal to or greater than predetermined frequency, and generating transmission frequency control information representing the decided transmission frequency.

An image determining method according to an aspect of the present invention includes: a second detecting process of performing, on an image region transmitted from an imaging apparatus, a detection process requiring more resources than resources used for detection of the image region in the imaging apparatus, and determining the image region whose detected second detection score is less than a predetermined threshold to be an erroneous detection; and an erroneous detection region deciding process of measuring a number of detection images determined to be an erroneous detection for each of a plurality of regions obtained by dividing an entire input image in the imaging apparatus, deciding a region in which a predetermined number of the detection images are measured, and generating erroneous detection region information representing the decided region.

Advantageous Effects of Invention

According to the present invention, it is possible to reduce the processing load of an imaging apparatus and to efficiently determine erroneous detection in the imaging apparatus.

DESCRIPTION OF EMBODIMENTS

Figure 1:
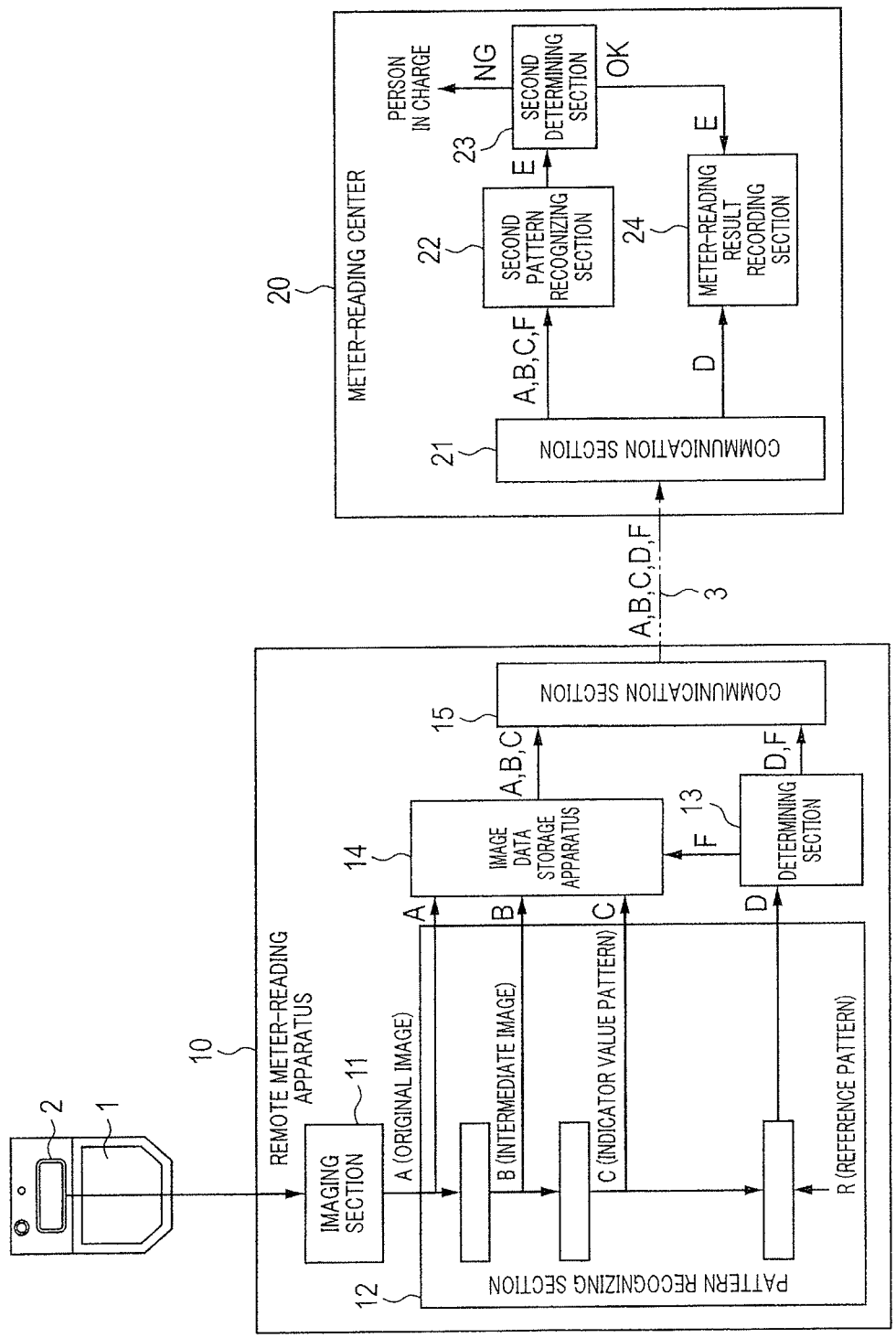
FIG. 1 is a block diagram illustrating a configuration of a remote meter-reading system disclosed in PTL 1.

Hereinafter, some embodiments of the present invention will be described with reference to the appended drawings. In the following embodiments, components having the same function are denoted by the same reference numerals, and any redundant description will be omitted.

Embodiment 1

Figure 2:
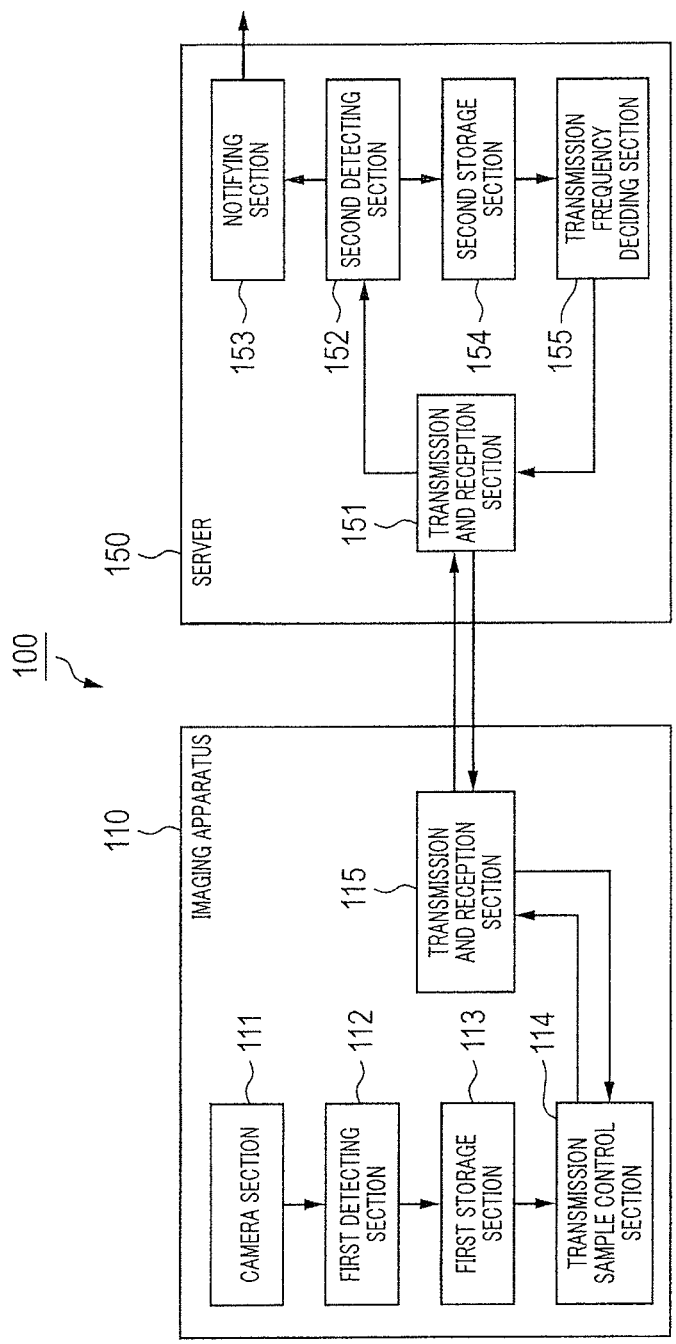
FIG. 2 is a block diagram illustrating a configuration of an image monitoring system according to Embodiment 1 of the present invention.

FIG. 2 is a block diagram illustrating a configuration of image monitoring system 100 according to Embodiment 1 of the present invention. The configuration of image monitoring system 100 will be described below with reference to FIG. 2. Referring to FIG. 2, image monitoring system 100 includes imaging apparatus 110 and server 150. Although FIG. 2 illustrates only one imaging apparatus, an assumption is made that a plurality of imaging apparatuses are actually connected to the server.

Imaging apparatus 110 includes camera section 111, first detecting section or first detector 112, first storage section 113, transmission sample control section or transmission sample controller 114, and transmission and reception or transmitter section 115. Camera section 111 receives an image from an imaging element such as a charge coupled device (CCD) imaging element or a complementary metal oxide semiconductor (CMOS) imaging element and outputs the received image to first detecting section 112.

First detecting section 112 detects, from the image output from camera section 111, a desired region through a detection frame configured with a rectangular region, for example, and outputs the detected image (hereinafter, referred to as "detection image") and a detection score (likelihood) of the image to first storage section 113 as a detection sample. Here, for example, an image region similar to a face model of a person is considered as a desired region. Further, there are cases in which a detection sample includes a detection position indicating the position of the detection frame (coordinates of an apex and vertical and horizontal lengths of a detection frame) and a detection IL) identifying the detection frame.

First storage section 113 stores the detection samples output from first detecting section 112, and outputs the detection samples stored for a predetermined period of time to transmission sample control section 114.

Transmission sample control section 114 selects a detection sample for a band in ascending order of detection scores among the detection samples for the predetermined period of time which are output from first storage section 113, and outputs transmission samples corresponding to the selected detection samples to transmission and reception section 115. Further, the transmission sample may include at least a detection image among corresponding detection samples and some or all of the detection score, the detection position, and the detection ID. When transmission frequency control information is output from transmission and reception section 115, transmission sample control section 114 selects the number of detection samples corresponding to the transmission frequency represented by transmission frequency control information, and outputs the transmission samples corresponding to the selected detection samples to transmission and reception section 115.

Transmission and reception section 115 transmits the transmission samples output from transmission sample control section 114 to server 150. The transmission frequency control information transmitted from server 150 is output to transmission sample control section 114.

Server 150 includes transmission and reception section 151, second detecting section or second detector 152, notifying section 153, second storage section 154, and transmission frequency deciding section 155. Transmission and reception section 151 receives the transmission samples transmitted from imaging apparatus 110, and outputs the received transmission samples to second detecting section 152. Further, transmission and reception section 151 transmits the transmission frequency control information output from transmission frequency deciding section 155 to imaging apparatus 110.

Second detecting section 152 obtains detection scores by performing a detection process (for example, a process of detecting a feature value of a dimension different from a dimension of first detecting section 112) requiring more resources such as a memory than first detecting section 112 of imaging apparatus 110 on the transmission samples output from transmission and reception section 151. Here, as the detection process requiring more resources than first detecting section 112, there is a process of obtaining a detection result with higher accuracy than that of first detecting section 112. Second detecting section 152 determines a transmission sample whose obtained detection score is smaller than a predetermined threshold to be an erroneous detection, and measures the frequency (the number of times per unit time) of an erroneous detection determination for each imaging apparatus. Second detecting section 152 outputs the frequency (erroneous detection frequency) of an erroneous detection determination of each imaging apparatus and an ID identifying an imaging apparatus to second storage section 154, and outputs an ID identifying an imaging apparatus having high erroneous detection frequency to notifying section 153.

Notifying section 153 notifies the administrator of the ID output from second detecting section 152.

Second storage section 154 stores the erroneous detection frequency of each imaging apparatus and the ID of the imaging apparatus output from second detecting section 152. When the previously stored imaging apparatus having high erroneous detection frequency is identical to the imaging apparatus having the high erroneous detection frequency output from second detecting section 152, second storage section 154 outputs the ID of the imaging apparatus to transmission frequency deciding section 155. Here, the high erroneous detection frequency means that the erroneous detection frequency is equal to or greater than the predetermined threshold. Further, second storage section 154 outputs an ID identifying an imaging apparatus that has been installed just before, an ID identifying an imaging apparatus in which a learning model has been just updated, and an ID identifying an imaging apparatus currently collecting learning samples to transmission frequency deciding section 155 as well.

Transmission frequency deciding section or transmission frequency generator 155 generates transmission frequency control information causing the imaging apparatus represented by the ID output from second storage section 154 to increase the transmission frequency of the transmission sample, and outputs the transmission frequency control information to transmission and reception section 151. As a result, it is possible to allocate a band preferentially to an imaging apparatus that is to collect more transmission samples among a plurality of imaging apparatuses. At this time, since a limited band is shared by a plurality of imaging apparatuses, transmission frequency deciding section 155 reads an imaging apparatus having low erroneous detection frequency from second storage section 154, and generates transmission frequency control information causing the read imaging apparatus to decrease the transmission frequency of the transmission sample. As described above, transmission frequency deciding section 155 controls the transmission frequency of a plurality of imaging apparatuses according to the erroneous detection frequency such that the number of transmission samples increases or decreases.

Next, an operation of image monitoring system 100 will be described. First, in imaging apparatus 110, first detecting section 112 detects desired regions and detection scores thereof from an image photographed by camera section 111.

Figure 3:
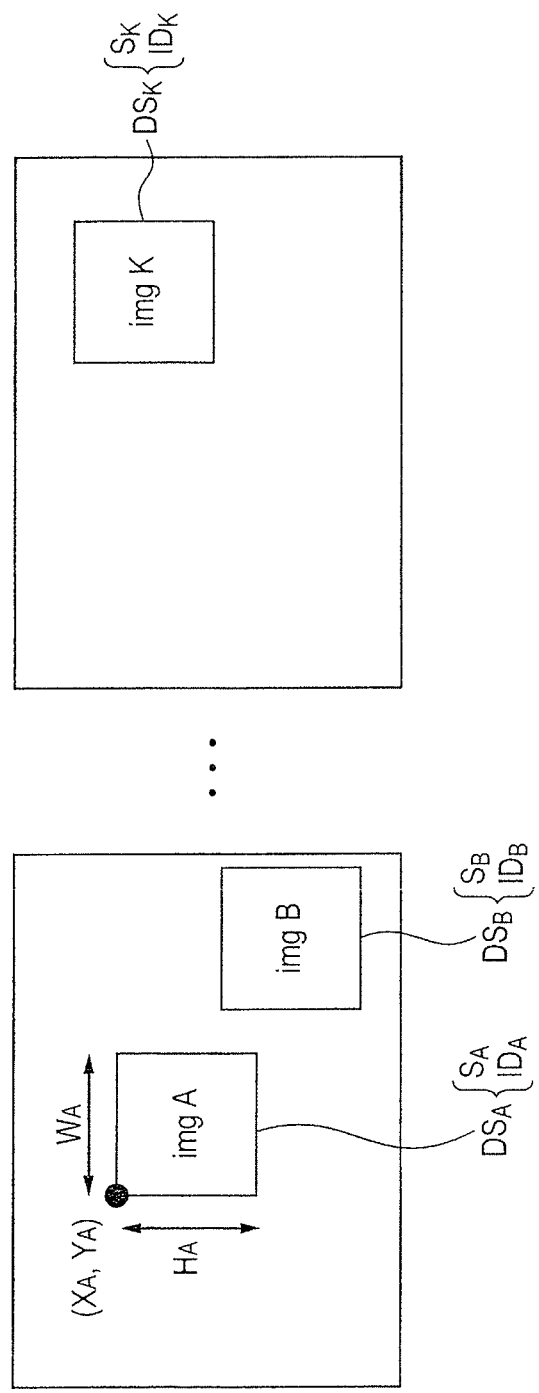
FIG. 3 is a diagram for describing a detection sample.

The detection samples including the detection image and the detection score thereof are stored in first storage section 113, and detection samples $DS_A$, $DS_B$, . . . , $DS_K$ (where, K=D) corresponding to a predetermined period of time are output to transmission sample control section 114 as illustrated in FIG. 3.

Among detection samples $DS_A$, $DS_B$, . . . , and $DS_D$ corresponding to the predetermined period of time, detection samples $DS_B$, $DS_C$, and $DS_D$ (where, $S_B<S_C<S_D<S_A$ is true for the detection scores) corresponding to a band (where, 3 transmission samples can be transmitted) are selected in the ascending order of the detection scores in transmission sample control section 114, and transmission samples $SS_B$, $SS_C$, and $SS_D$ corresponding to the selected detection samples $DS_B$, $DS_C$, and $DS_D$ are transmitted to server 150 through transmission and reception section 115.

As a detection image having a low detection score is preferentially transmitted to server 150 as described above, server 150 can perform high-accuracy detection on a detection image that is likely to result in an erroneous detection.

In server 150, second detecting section 152 performs a detection process requiring more resources than first detecting section 112 on transmission samples $SS_B$, $SS_C$, and $SS_D$ transmitted from imaging apparatus 110, and obtains detection scores. Second detecting section 152 determines a transmission sample whose obtained detection score is smaller than a predetermined threshold to be an erroneous detection, and measures the frequency of an erroneous detection determination for each imaging apparatus.

When the imaging apparatus having the previously stored high erroneous detection frequency is identical to the imaging apparatus having the high erroneous detection frequency output from second detecting section 152, second storage section 154 outputs the ID of the imaging apparatus to transmission frequency deciding section 155. By confirming that the imaging apparatus having the high erroneous detection frequency output from second detecting section 152 has been already stored, it is possible to specify an imaging apparatus in which erroneous detection continuously occurs.

Transmission frequency deciding section 155 generates transmission frequency control information causing the imaging apparatus represented by the ID specified by second storage section 154 to increase the transmission frequency of the transmission sample. Further, transmission frequency deciding section 155 reads an ID of an imaging apparatus having low erroneous detection frequency from second storage section 154, and generates transmission frequency control information causing the read imaging apparatus to decrease the transmission frequency of the transmission sample.

The transmission frequency control information generated by transmission frequency deciding section 155 is transmitted to imaging apparatus 110 through transmission and reception section 151.

Transmission sample control section 114 of imaging apparatus 110 acquires the transmission frequency control information transmitted from server 150, selects the number of detection samples corresponding to the transmission frequency indicated by the acquired transmission frequency control information, and transmits transmission samples corresponding to the selected detection samples to server 150 through transmission and reception section 115.

Figure 4B:
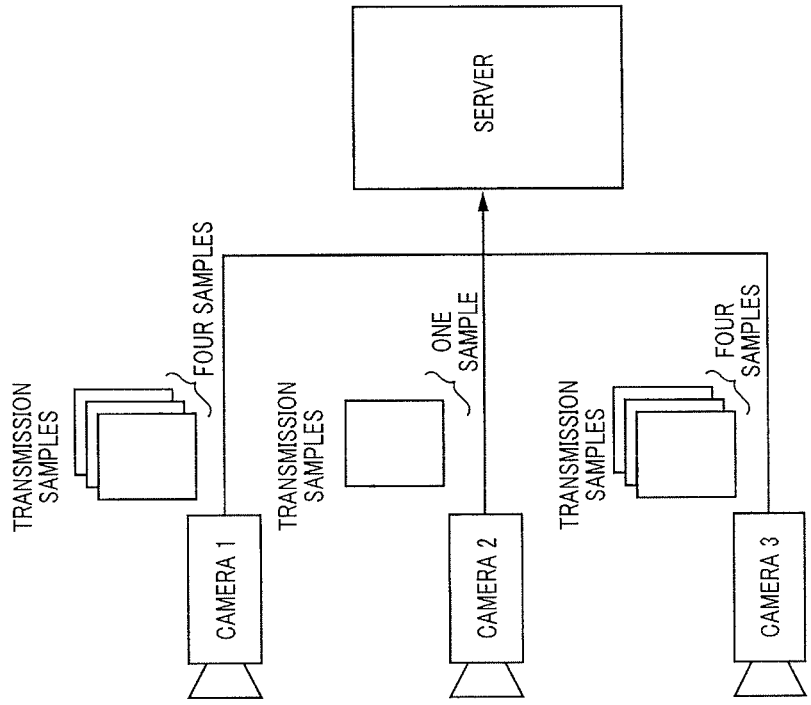
FIGS. 4A and 4B are diagrams illustrating how transmission frequency is set for each camera.
Figure 4A:
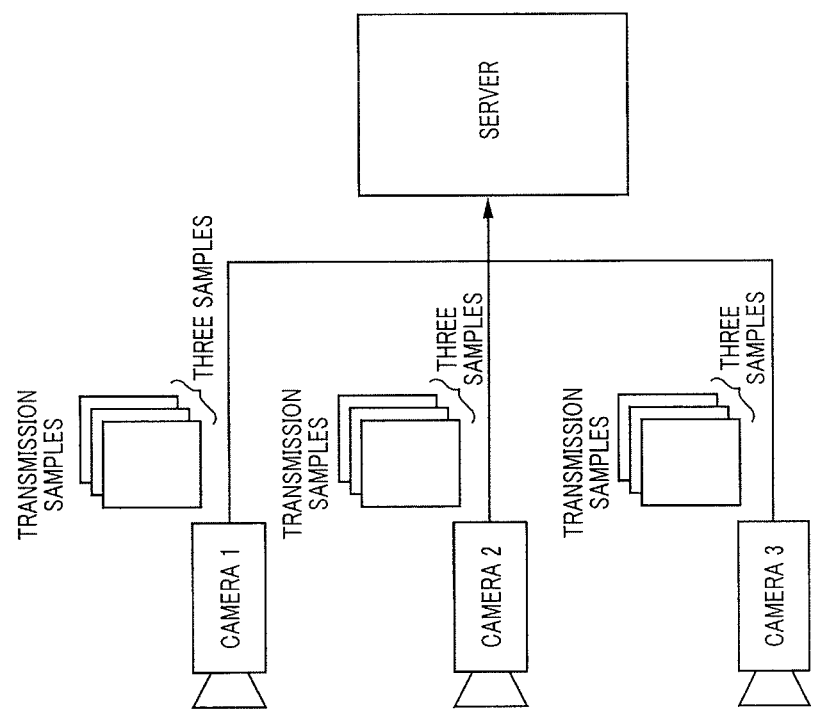

As described above, controlling the transmission frequency for a plurality of imaging apparatuses according to the erroneous detection frequency such that the number of transmission samples increases or decreases within a limited band allows server 150 to perform an erroneous detection determination of a detection image with high accuracy. For example, referring to FIG. 4A, an assumption is made that cameras 1 to 3 each transmit three transmission samples to the server before the transmission frequency is controlled. Here, it is assumed that in camera 1, a transmission sample is determined to be an erroneous detection, in camera 2, no transmission samples are determined to be an erroneous detection for a long period of time, and in camera 3, a learning model has been just updated. In this case, transmission frequency deciding section 155 sets high transmission frequency for camera 1 and camera 3 and sets low transmission frequency for camera 2. As a result, after the transmission frequency is controlled, each of camera 1 and camera 3 is set to transmit four transmission samples, and camera 2 is set to transmit one transmission sample as illustrated in FIG. 4B.

As described above, according to Embodiment 1, the first detecting section of the imaging apparatus preferentially transmits a detection image having a low detection score among detected detection images to the server, and the second detecting section of the server performs the detection process requiring more resources than the first detecting section on a detection image transmitted by the imaging apparatus, determines whether or not the detection image has been erroneously detected based on the obtained detection score, and gives an instruction to increase the transmission frequency to the imaging apparatus having the high erroneous detection frequency. As a result, the imaging apparatus that has received the instruction to increase the transmission frequency can transmit more detection images, and the server can perform an erroneous detection determination of an detection image with a high degree of accuracy, and thus it is possible to reduce the processing load of the imaging apparatus and to verify a detection image transmitted from the imaging apparatus having the high erroneous detection frequency with high accuracy.

Embodiment 2

Figure 5:
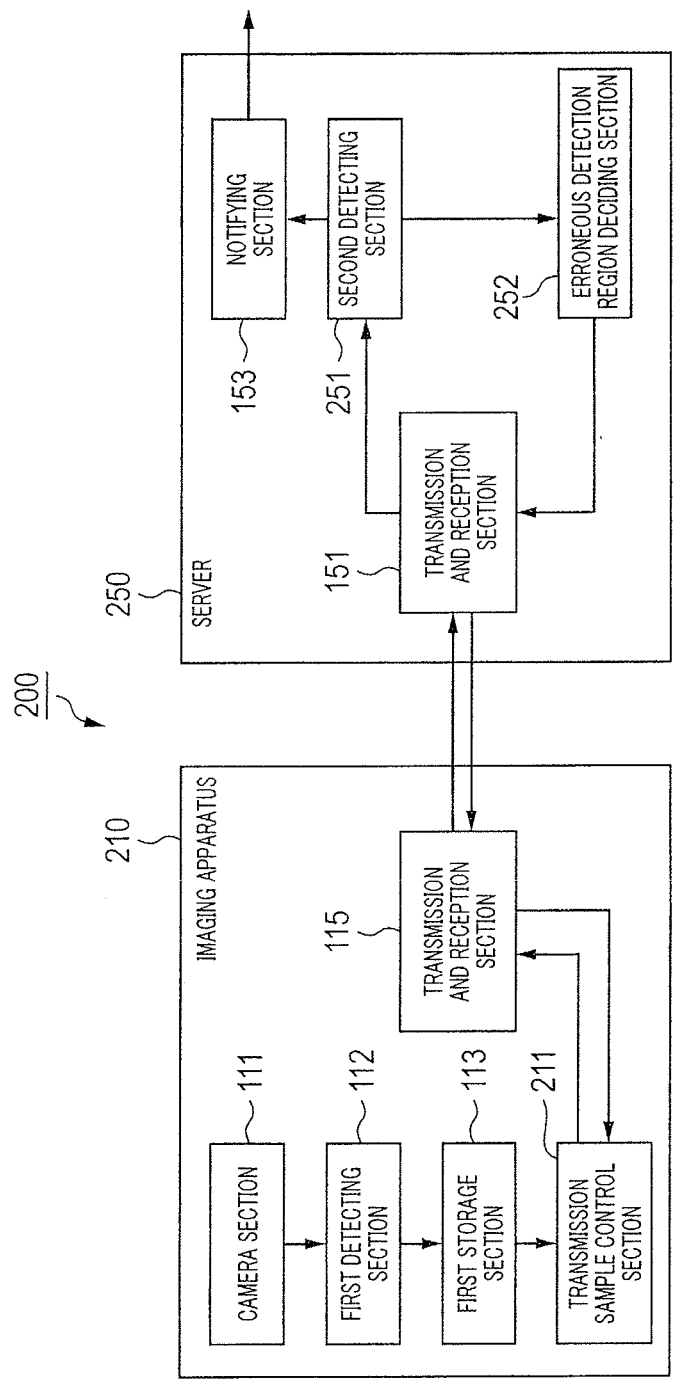
FIG. 5 is a block diagram illustrating a configuration of an image monitoring system according to Embodiment 2 of the present invention.

FIG. 5 is a block diagram illustrating a configuration of image monitoring system 200 according to Embodiment 2 of the present invention. A configuration of image monitoring system 200 will be described below with reference to FIG. 5. FIG. 5 is different from FIG. 2 in that, in an imaging apparatus, transmission sample control section 114 is replaced with transmission sample control section 211, and in a server, second storage section 154 is removed, second detecting section 152 is replaced with second detecting section 251, and transmission frequency deciding section 155 is replaced with erroneous detection region deciding section 252.

Transmission sample control section 211 selects detection samples for a hand in the ascending order of the detection scores among detection samples for a predetermined period of time output from first storage section 113, and outputs transmission samples corresponding to the selected detection samples to transmission and reception section 115. Further, when erroneous detection region information is output from transmission and reception section 115, transmission sample control section 211 reads a detection sample of a region indicated by the erroneous detection region information from first storage section 113, and outputs a transmission sample corresponding to the read detection sample to transmission and reception section 115.

Second detecting section 251 performs the detection process requiring more resources such as a memory than first detecting section 112 of imaging apparatus 210 on the transmission samples output from transmission and reception section 151, and obtains detection scores. Second detecting section 251 determines the transmission sample whose obtained detection score is smaller than a predetermined threshold to be an erroneous detection, and outputs a detection position of the transmission sample determined to be an erroneous detection to erroneous detection region deciding section 252.

Erroneous detection region deciding section 252 measures the number of transmission samples determined to be an erroneous detection for each of a plurality of regions obtained by dividing an entire input image based on the detection position output from second detecting section 251. Erroneous detection region deciding section 252 generates erroneous detection region information indicating a region in which a certain number is measured, and outputs the generated erroneous detection region information to transmission and reception section 151. Further, erroneous detection region deciding section 252 may output an instruction (transmission frequency control information) causing imaging apparatus 210 to increase the transmission frequency of the transmission sample to transmission and reception section 151 together with the erroneous detection region information.

Further, when there are a plurality of cameras, an entire input image may be divided into a plurality of regions for each camera, and the number of transmission samples determined to be an erroneous detection may be measured for each divided region. Erroneous detection region deciding section 252 generates erroneous detection region information representing a region in which a predetermined number is measured for each camera, and outputs the generated erroneous detection region information to transmission and reception section 151.

Figure 6:
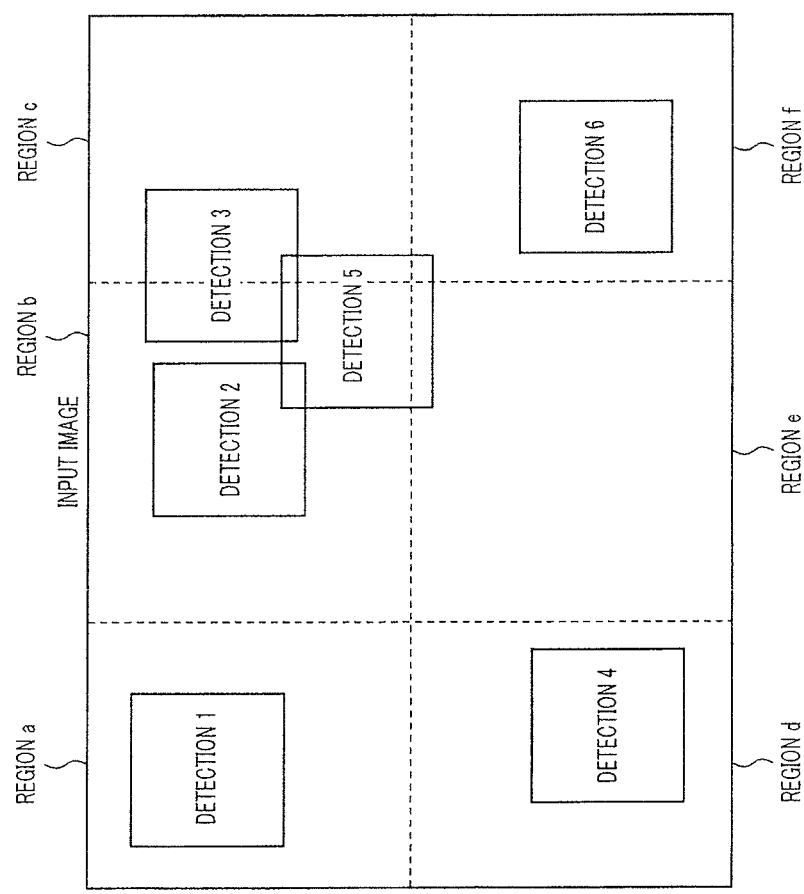
FIG. 6 is a diagram for describing an operation of a transmission sample control section according to Embodiment 2 of the present invention.

Next, an operation of transmission sample control section 211 of image monitoring system 200 described above will be described with reference to FIG. 6. FIG. 6 illustrates detection frames 1 to 6 in images input during a predetermined period of time. Here, for convenience of description, an example in which detection frames in different input images are illustrated on the same input image, and an entire input image is divided into six regions (a to f).

When an initial setting is performed or when no erroneous detection region information is received from server 250, transmission sample control section 211 equally selects a detection image having a low detection score from the entire input image illustrated in FIG. 6. Here, the number of transmission samples is assumed to be three, and the detection frames 1, 3, and 6 are assumed to be selected. Further, when a plurality of detection images are close to each other, one detection image is selected. Specifically, in FIG. 6, when detection frame 3 is lowest in detection score among detection frames 2, 3, and 5, detection frame 3 is selected.

Further, when the erroneous detection region information (representing region b herein) is received from server 250, transmission sample control section 211 selects detection frames of region b represented by the erroneous detection region information for the number of transmission samples. Specifically, when the number of transmission samples is three, since the erroneous detection region information represents region b, detection frames 2, 3, and 5 are selected. Here, when there are detection frames equal to or greater than the number of transmission samples in the region represented by the erroneous detection region information, detection frames are selected in the ascending order of the detection scores. Further, there are only detection frames less than the number of transmission samples in the region represented by the erroneous detection region information, detection frames are selected from the entire input image in the ascending order of the detection scores to meet the number of transmission samples.

As described above, according to Embodiment 2, the first detecting section of the imaging apparatus preferentially transmits a detection image having a low detection score among detected detection images to the server, and the second detecting section of the server performs the detection process requiring more resources than the first detecting section on the detection image transmitted by the imaging apparatus, determines whether or not the detection image has been erroneously detected based on the obtained detection score, measures the number of detection images determined to be an erroneous detection for each of a plurality of regions obtained by dividing the entire input image in the imaging apparatus, and instructs the imaging apparatus to transmit the region in which a predetermined number of the detection images are measured. As a result, the imaging apparatus can transmit the image of the region instructed through the erroneous detection region information to the server, and the server can perform an erroneous detection determination with high accuracy, and thus it is possible to verify the region determined to be an erroneous detection with high accuracy.

The embodiments have been described so far.

Figure 7:
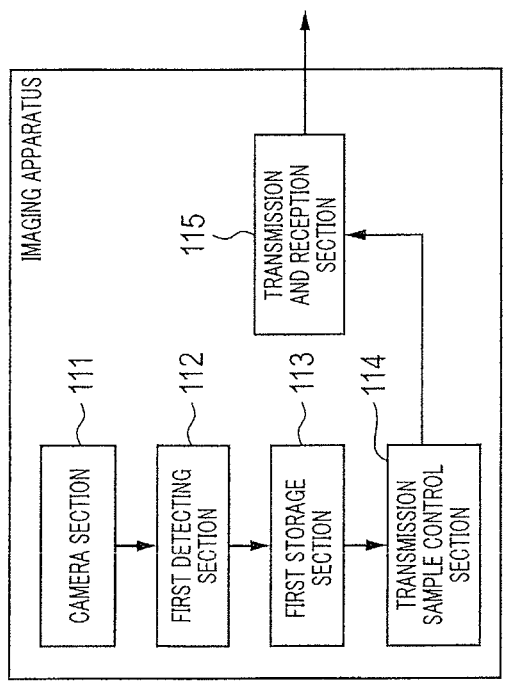
FIG. 7 is a block diagram illustrating another configuration of an imaging apparatus.

The above embodiments have been described in connection with the case in which detection samples for a predetermined period of time are transmitted from first storage section 113 of imaging apparatus 110 (210) to transmission sample control section 114 (211), but a configuration illustrated in FIG. 7 may be employed. Referring to FIG. 7, first storage section 113 stores the detection samples (for example, $DS_A$, $DS_B$, $DS_C$, and $DS_D$) output from first detecting section 112, outputs a detection list including a detection ID and a detection score among the stored detection samples to transmission sample control section 114, and outputs transmission samples ($SS_A$, $SS_B$, $SS_C$, and $SS_D$) corresponding to the stored detection samples ($DS_A$, $DS_B$, $DS_C$, and $DS_D$) to the transmission and reception section. A set of a detection ID and a detection score is used as the detection list, and for example, $(ID_A,S_A)$, $(ID_B,S_B)$, $(ID_C, S_C)$, and $(ID_D,S_D)$ are used as the detection list.

Transmission sample control section 114 generates the transmission sample list (for example, $ID_A$ and $ID_B$ when two transmission samples can be transmitted) from the detection list output from first storage section 113, and outputs the generated transmission sample list to transmission and reception section 115.

Transmission and reception section 115 selects the transmission samples ($SS_A$ and $SS_B$) corresponding to the transmission sample list ($ID_A$ and $ID_B$) output from transmission sample control section 114 from the transmission samples ($SS_A$, $SS_B$, $SS_C$, and $SS_D$) output from first storage section 113, and transmits the selected transmission samples to the server.

Figure 8:
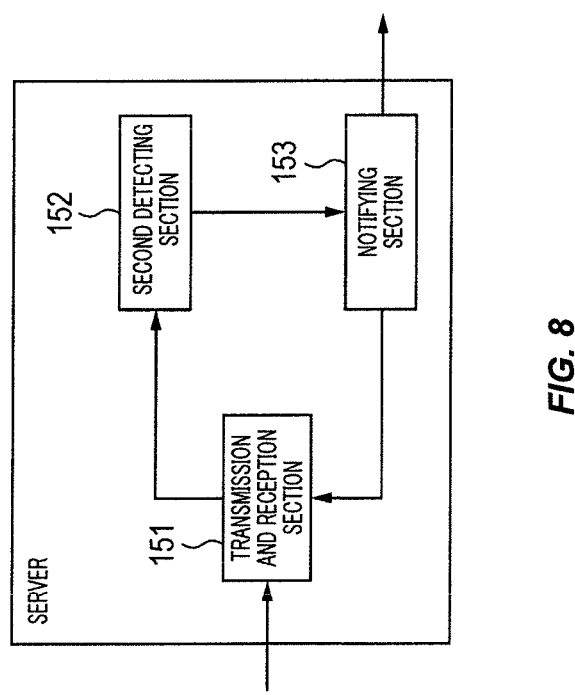
FIG. 8 is a block diagram illustrating another configuration of a server.

Embodiment 1 has been described in connection with the case in which server 150 includes transmission frequency deciding section 155, and Embodiment 2 has been described in connection with the case in which server 250 includes erroneous detection region deciding section 251, but the present invention is not limited to the above cases described above. For example, as illustrated in FIG. 8, second detecting section 152 may obtain a transmission sample of high frequency whose detection score is smaller than a threshold and notify notifying section 153 of an ID identifying an imaging apparatus that has transmitted the corresponding transmission sample.

Performing the detection process requiring more resources than the first detecting section of the imaging apparatus by the second detecting section of the server as described above reduces the processing load of the imaging apparatus and thus makes it possible to efficiently determine erroneous detection in the imaging apparatus.

In the above embodiments, the image monitoring system, the server apparatus, the imaging apparatus, and the image determining method have been described, but it is also possible to build a system for an application other than image monitoring such as a system for analyzing the trend of store visitors in a store, for example, by detecting a person or a face from an image, an image processing system that performs work analysis of workers in a factory, and the like using the present invention.

Further, a security-purpose surveillance camera or a non-security-purpose network camera may be used as the camera section.

Further, imaging apparatus 110 and server 150 may be connected to each other via a wired network or a wireless network.

The disclosure of the specification, drawings and abstract in Japanese Patent Application No. 2012-094538 filed on Apr. 18, 2012 is incorporated herein by reference in its entirety.

INDUSTRIAL APPLICABILITY

The image processing system, the server apparatus, the imaging apparatus, and the image determining method according to the present invention are suitable for reducing a processing load of an imaging apparatus and efficiently determining erroneous detection in the imaging apparatus.

REFERENCE SIGNS LIST

110, 210 Imaging apparatus
111 Camera section
112 First detecting section
113 First storage section 114, 211 Transmission sample control section
115, 151 Transmission and reception section
150, 250 Server
152, 251 Second detecting section
153 Notifying section
154 Second storage section
155 Transmission frequency deciding section
252 Erroneous detection region deciding section

The invention claimed is:

1. An image processing system, comprising:
an image transmitting apparatus; and
a receiving apparatus, wherein
the image transmitting apparatus includes:
  a first detector that detects at least one desired image region from each of a plurality of images;
  a transmission sample controller that selects an image region from among the detected image regions; and
  a transmitter that transmits the selected image region, and
the receiving apparatus includes:
  a second detector that performs a detection process requiring more resources than the first detector on the image region transmitted from the image transmitting apparatus, and that determines the image region having a detection score that is less than a predetermined threshold to be an erroneous detection, wherein
the transmission sample controller selects, for preferential transmission, the image region whose detection score, by the first detector, is less than a predetermined threshold from among the detected image regions, and
the transmitter preferentially transmits the image region selected by the transmission sample controller.

2. The image processing system according to claim 1, comprising a plurality of the image transmitting apparatuses, wherein:
the receiving apparatus further comprising
a transmission frequency generator that decides a transmission frequency for a first image transmitting apparatus so that the number of the image regions transmitted from the first image transmitting apparatus to the receiving apparatus per unit of time surpasses the number of the image regions transmitted from a second image transmitting apparatus to the receiving apparatus per unit of time, the first image transmitting apparatus being the image transmitting apparatus for which a frequency of an erroneous detection determination, among the image regions transmitted by the first image transmitting apparatus, is equal to or greater than a predetermined frequency, the second image transmitting apparatus being the image transmitting apparatus for which a frequency of an erroneous detection determination, among the image regions transmitted by the second image transmitting apparatus, is less than the predetermined frequency, and that generates transmission frequency control information representing the decided transmission frequency; and
the transmitter transmits the generated transmission frequency control information to the receiving apparatus.

3. An image processing system, comprising:
a plurality of image transmitting apparatuses; and
a receiving apparatus, wherein
each of the image transmitting apparatuses includes:
a first detector that detects at least one desired image region from each of a plurality of images;
a transmission sample controller that selects an image region from among the detected image regions; and
a transmitter that transmits the selected image region, and
the receiving apparatus includes:
a second detector that performs a detection process requiring more resources than the first detector on the image region transmitted from the image transmitting apparatus, and that determines the image region having a detection score that is less than a predetermined threshold to be an erroneous detection, wherein;
the receiving apparatus further comprising
a transmission frequency generator that decides a transmission frequency for a first image transmitting apparatus so that the number of the image regions transmitted from the first image transmitting apparatus to the receiving apparatus per unit of time surpasses the number of the image regions transmitted from a second image transmitting apparatus to the receiving apparatus per unit of time, the first image transmitting apparatus being the image transmitting apparatus for which a frequency of an erroneous detection determination, among the image regions transmitted by the first image transmitting apparatus, is equal to or greater than a predetermined frequency, the second image transmitting apparatus being the image transmitting apparatus for which a frequency of an erroneous detection determination, among the image regions transmitted by the second image transmitting apparatus, is less than the predetermined frequency, and that generates transmission frequency control information representing the decided transmission frequency; and
the transmitter transmits the generated transmission frequency control information to the receiving apparatus.

* * * * *